(12) United States Patent
Sakakibara et al.

(10) Patent No.: US 6,969,935 B2
(45) Date of Patent: Nov. 29, 2005

(54) VEHICLE ALTERNATOR

(75) Inventors: Hiroshi Sakakibara, Chita-gun (JP); Kenji Kuroiwa, Wako (JP)

(73) Assignees: Denso Corporation, Kariya (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/824,359

(22) Filed: Apr. 15, 2004

(65) Prior Publication Data

US 2004/0207275 A1   Oct. 21, 2004

(30) Foreign Application Priority Data

Apr. 17, 2003   (JP) .............................. 2003-112251

(51) Int. Cl.⁷ .......................... H02K 5/00; H02K 5/24; H02K 9/00; F16F 15/00
(52) U.S. Cl. ............................ 310/85; 310/89; 310/58; 123/41.31; 123/195 E
(58) Field of Search .................. 310/89, 58, 60 R, 310/62, 60 A, 85; 180/62.5, 65.3; 123/41.31, 123/195 E

(56) References Cited

U.S. PATENT DOCUMENTS

| 4,288,711 | A | * | 9/1981 | Hagenlocher et al. | .... 310/68 D |
| 4,961,016 | A | * | 10/1990 | Peng et al. | ................... 310/62 |
| 6,051,906 | A | * | 4/2000 | Umeda et al. | .............. 310/179 |

FOREIGN PATENT DOCUMENTS

| JP | A 2002-119008 | 4/2002 |
| JP | A 2002-315283 | 10/2002 |

* cited by examiner

*Primary Examiner*—Tran Nguyen
(74) *Attorney, Agent, or Firm*—Oliff & Berridge, PLC

(57) ABSTRACT

An alternator is vertically mounted to an engine in a vehicle. The engine is arranged such that a crank shaft is vertical with respect to the ground and a crank shaft pulley is fixed to a lower end of the crank shaft such that a rotation axis of the crank shaft pulley is parallel to the crank shaft. The engine is provided with a mounting bracket and the alternator is fixed to the mounting bracket in a condition that an alternator pulley faces downward and electrical components are arranged at the upper portion of the alternator.

5 Claims, 3 Drawing Sheets

VEHICLE ALTERNATOR

CROSS REFERENCE TO RELATED APPLICATION

This application is based on Japanese Patent Application No. 2003-112251 filed on Apr. 17, 2003, the disclosure of which is incorporated herein by reference.

FIELD OF THE INVENTION

The present invention relates to an alternator mounted on automobiles, trucks, and special vehicles such as snow-removing cars or the like.

BACKGROUND OF THE INVENTION

In general, a vehicle alternator is horizontally mounted to an engine so that a rotation shaft of the alternator is parallel to the ground, that is, horizontal, as shown in FIG. 5.

For example, Unexamined Japanese Patent Publication No. JP-A-2002-315283 discloses a vehicle alternator mounted in the above manner. In this alternator, a rear frame is formed with a discharge port for discharging abrasion powder generated by brushes. Further, it is designed so that the discharge port is open in a downward direction. However, if a mounting position or angle of the alternator is changed with differences of vehicles or engine layout, it is required to newly form or redesign the rear frame so that the discharge port is always open in the downward direction. Accordingly, it takes time to design or plan the rear frame and results in an increase in cost.

In addition, because the space of an engine compartment tends to be narrowed, recently. If the alternator is arranged such that electrical components such as a rectifying device provided on the rear side of the alternator are proximate to heat-generating components such as an exhaust manifold through a small gap between them, the electrical components will be affected by heat. Therefore, durability of the electrical components of the alternator will be decreased.

As another example, unexamined Japanese Patent Publication No. JP-A-2002-119008 proposes to mount a vehicle alternator such that a pulley faces upward and a rear cover faces downward. That is, the electrical components are located closer to the ground. Although the electrical components are covered with a rear cover, the rear cover forms discharge openings for discharging water and air intake openings for sucking air. Therefore, the electrical components covered with the rear cover will be easily affected by splashed water or mud from the ground. As a result, the electrical components will be rusted or electrically corroded. Thus, durability of those components will be largely decreased. Further, in this arrangement, it is difficult to properly discharge the brush powder. If the brush powder will adhere to slip rings on the rotation shaft, the brushes will be abnormally abraded.

SUMMARY OF THE INVENTION

The present invention is made in view of the foregoing matter and it is an object of the present invention to provide a vehicle alternator capable of improving durability with reduced costs.

According to the present invention, an alternator is mounted to an engine of a vehicle. The alternator includes a rotor rotatably supported about a rotation shaft, a stator arranged on an outer periphery of the rotor, a frame holding the rotation shaft and the stator, a pulley connected to a first end of the rotation shaft on an outside of the frame, an electrical component such as a brush device arranged adjacent to a second end of the rotation shaft on the outside of the frame, and a protection cover covering the electrical component. When installed in the vehicle, the alternator is arranged such that the second end of the rotation shaft is higher than the first end.

Accordingly, the alternator is mounted such that the pulley faces downward and the electrical component is arranged on the top side of the frame. When a discharge port for discharging brush powder is formed in an axial end face of the frame, which faces upward, the discharge port opens in a substantially horizontal direction. Therefore, it is not required to change the position of the discharge port with the change in an mounting position of the frame. Also, since the discharge port is arranged under the brush device, it is not required to form a recess for collecting the brush powder in the protection cover. Accordingly, costs can be reduced.

Further, since the electrical component is arranged on the top side of the alternator, the electrical component is separate from heat-radiating component such as an exhaust manifold. Therefore, the electrical component is less likely to be affected by heat. Also, the electrical component is less likely to be affected by splashes of water or mud from the ground while the vehicle travels. Accordingly, durability of the electrical component is improved.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

An embodiment of the present invention will be described hereinafter with reference to the drawings.

Figure 1:
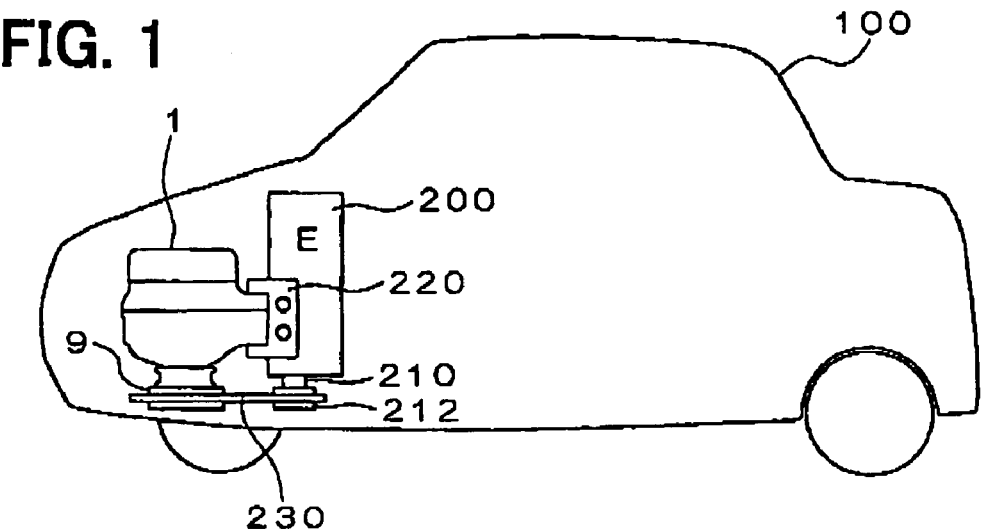
FIG. 1 is a schematic view of a vehicle alternator mounted to a vehicle engine according to an embodiment of the present invention.

Referring to FIG. 1, a vehicle alternator 1 of the embodiment is mounted to an engine 200 installed in a vehicle 100. The vehicle 100 can be an automobile, truck or other specific vehicles such as a snow-removing car.

The engine 200 is placed vertically such that a crank shaft 210 is vertical with respect to the ground. A crank shaft pulley 212 is fixed to a lower end of the crank shaft 210 such that a rotation axis of the crank shaft pulley 212 is vertical. The engine 200 is provided with a mounting bracket 220. The alternator 1 is fixed to the mounting bracket 220.

The alternator 1 is driven by the engine 200. The alternator 1 charges electricity to a vehicle-mounted battery (not shown) and supplies power to various electrical loads (not shown). The alternator 1 is fixed to the mounting bracket 200 such that a pulley 9, which receives a rotation force from the engine 200, faces downward.

Figure 2:
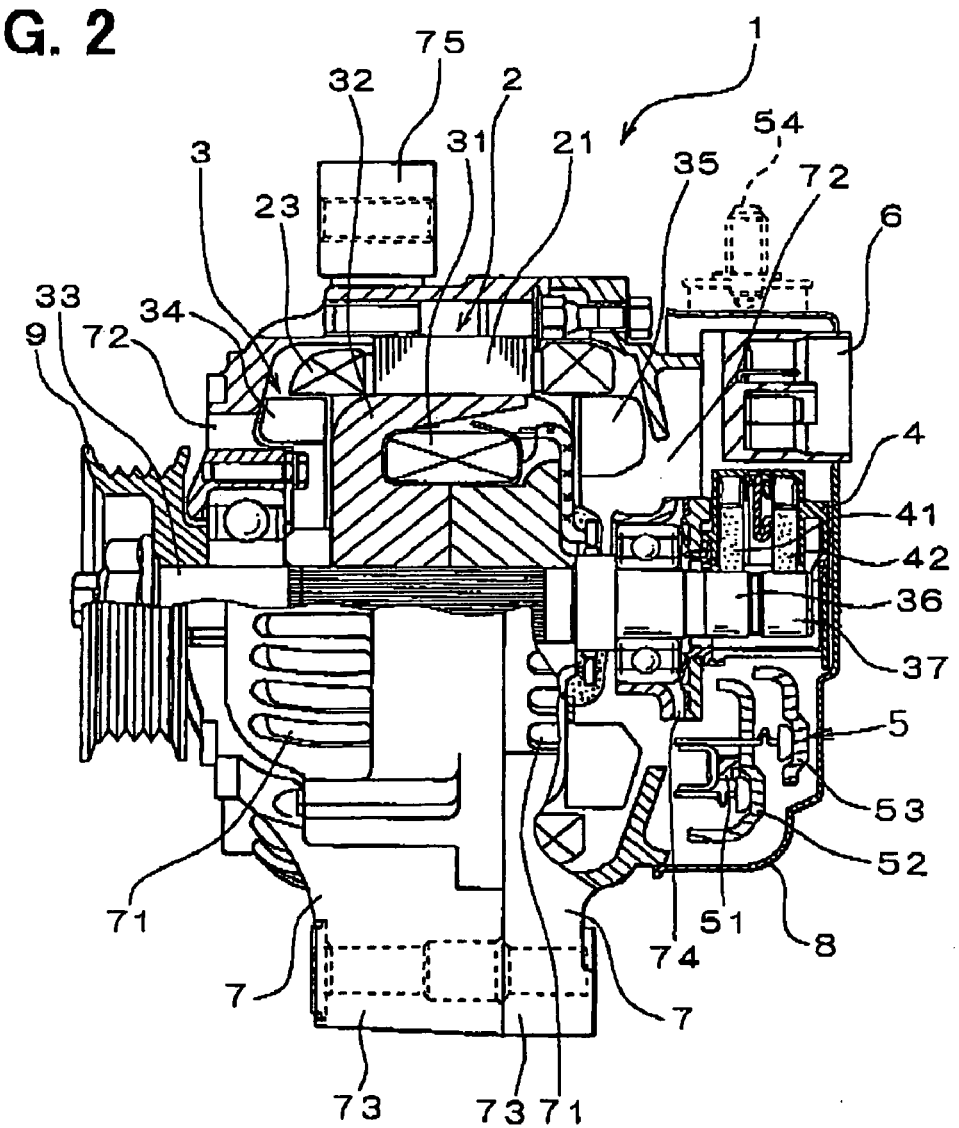
FIG. 2 is a schematic cross-sectional view of the alternator according to the embodiment of the present invention.

As shown in FIG. 2, the alternator 1 is constructed of a stator 2, a rotor 3, a brush device 4, a rectifying device 5, a regulator 6, frames 7, a rear cover (protection cover) 8 and the pulley 9 and the like.

The stator 2 includes a stator core 21 forming multiple slots and a three-phase stator winding 23 wound around the stator core 21 through the slots with predetermined patterns.

The rotor 3 includes a field winding 31, pole cores 32 and a rotation shaft 33. The field winding 31 is constructed by concentrically and cylindrically winding an insulated copper wire. Each of the pole cores 32 has six claw portions. The pole cores 32 are fixed around the rotation shaft 33 in a condition that the field winding 31 is sandwiched between them in an axial direction. Further, an axial flow-type cooling fan 34 is fixed to an axial end face of the front pole core (left pole core in FIG. 2) 32 such as by welding. The axial flow-type cooling fan 34 sucks air from a front side of the alternator 1 (left side in FIG. 1) and blows the air in the axial direction and in a radial direction. A centrifugal-type cooling fan 35 is fixed to an axial end face of the rear pole core (right pole core in FIG. 2) 32 such as by welding. The centrifugal-type cooling fan 35 suck air from the rear side of the alternator 1 (right side in FIG. 2) and blows the air in the radial direction.

The brush device 4 is provided to supply an exciting current to the field winding 31 from the rectifying device 5. The brush device 4 includes brushes 41, 42. The brushes 41, 42 are respectively urged toward slip rings 26, 27 formed on the rotation shaft 33. The rectifying device 5 is provided to rectify three-phase ac voltage, which is produced from the stator winding 23 and output d.c. power. The rectifying device 5 includes a terminal board 51 embedding wiring electrodes therein, a positive heat radiating fin 52 in which three diodes are fixed, a negative heat radiating fin 53 in which three diodes are fixed, and an output terminal 54 fixed to the positive heat radiating fin 52 for outputting the power to the outside. The regulator 6 regulates the exciting current in the field winding 31, thereby to control the output voltage of the alternator 1.

The frames 7 includes a front frame (left in FIG. 2) and a rear frame (right in FIG. 2) and houses the stator 2 and the rotor 3 therein. The rotor 3 is rotatably supported about the rotation shaft 3. The stator 2 is arranged on the outer periphery of the rotor 3 with a predetermined space between them. The frames 7 form air-discharging openings 71 through which air is discharged at positions corresponding to the outer periphery of the stator winding 23 that projects from the axial ends of the stator core 21. Also, the frames 7 form air intake openings 72 through which air is sucked at the axial end walls thereof. The frames 7 partly form mounting stays 73 projecting in a radially outward direction. The mounting stays 73 are fixed to the mounting bracket 220 of the engine 200.

Figure 3:
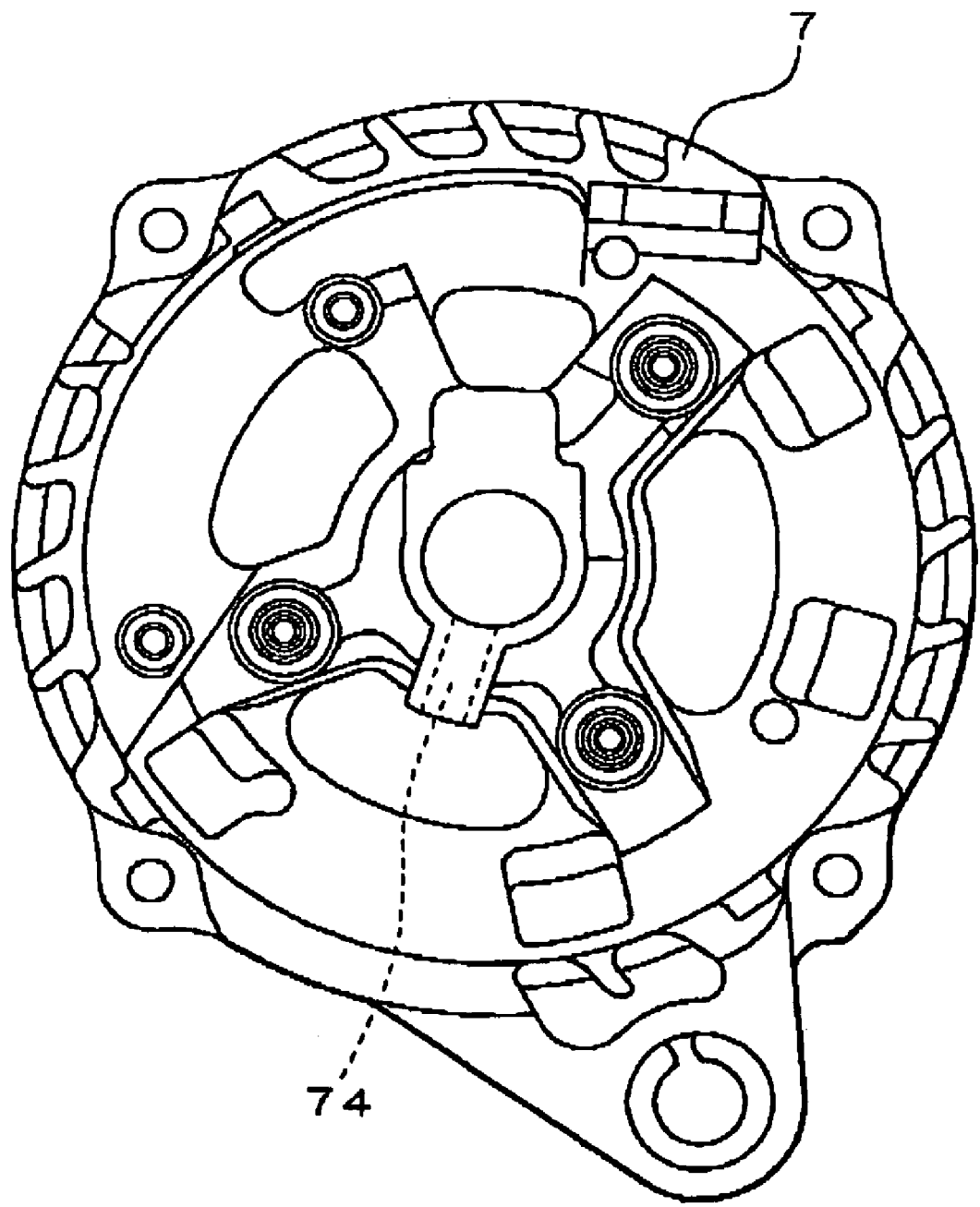
FIG. 3 is a plan view of a rear frame of the alternator according to the embodiment of the present invention.

The rear frame 7 forms a recess portion 74 on an inside surface of its axial end wall to which the brush device 4 contacts. As shown in FIG. 3, the recess portion 74 extends in the radial direction. The recess portion 74 is provided such that brush powder, which is generated by the brushes 41, 42 while sliding on the slip rings 36, 37, is discharged from the periphery of the slip rings 36, 37 to the outside through the recess portion 74.

The protection cover 8 entirely surrounds the electrical components located on the outside of the rear frame 7 to protect them. The electrical components include the brush device 4, the rectifying device 5 and the regulator 6. The protection cover 8 forms air intake openings for sucking air, on its rear face.

When installed in the vehicle, the alternator 1 is mounted such that rear side (right side in FIG. 2) faces upward and the front side (left side in FIG. 2) faces downward. That is, the alternator 1 is vertically mounted to the engine 200 such that the rotation shaft 33 is vertical.

Specifically, the pulley 9 faces downward, and the electrical components including the brush device 4, and the rectifying device 5 and the regulator 6 are arranged at the upper position. Further, as shown in FIG. 1, the pulley 9 of the alternator 1 and the crank shaft pulley 212 of the engine 200 are arranged parallel and at the substantially same level. The alternator pulley 9 and the crank shaft pulley 212 are connected through a driving belt 230 having moderate tension so that the driving power is transmitted from the engine 200 to the alternator 1.

Since the alternator 1 is vertically mounted to the engine 200, the recess portion 74 extends in the horizontal direction and the discharging port at the end of the recess portion 74 opens in the horizontal direction. Accordingly, it is not required to change the position of the recess portion 74 and the open direction of the discharging port with the change of the mounting position of the frame 7. Also, since the discharging port for the brush powder is arranged at the level lower than the brush device 4, it is unnecessary to form a recess for collecting the brush powder on the protection cover 8. Since it is not required to newly make or redesign the frame 7 and the protection cover 8, the manufacturing costs can be reduced.

Since the electrical components including the brush device 4 are arranged at the upper portion in the alternator 1, the electrical components are separate from heat-generating components such as an exhaust manifold. Therefore, the electrical components are less likely to be affected by heat. Also, the electrical components will be protected from splashes of water or mud from the ground while the vehicle 100 travels. Accordingly, the durability of the electrical components can be improved.

The present invention should not be limited to the disclosed embodiment, but may be implemented in other ways without departing from the spirit of the invention.

Figure 4:
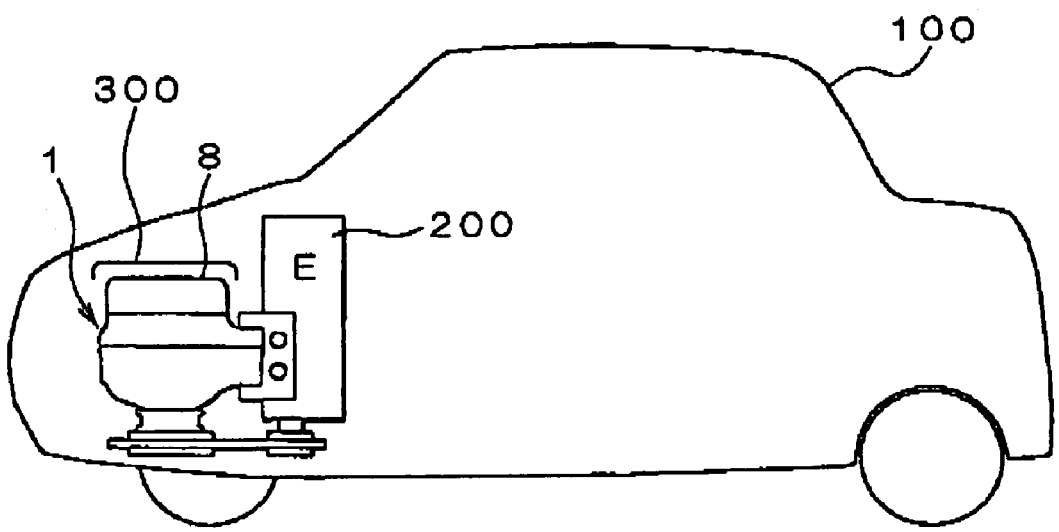
FIG. 4 is a schematic view of the vehicle alternator with a top cover according to the embodiment of the present invention.
Figure 5:
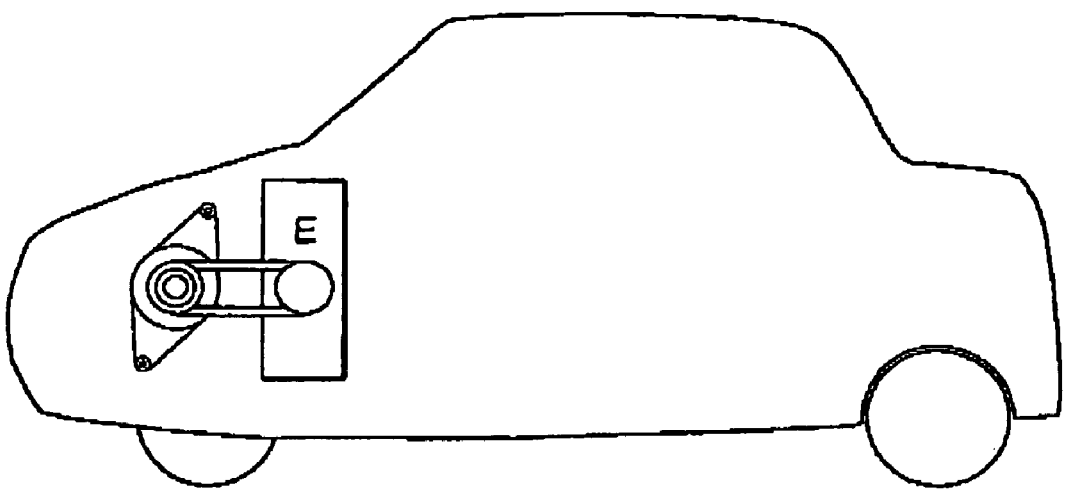
FIG. 5 is a schematic view of a vehicle alternator mounted to an engine of a related art.

For example, a top cover 300 can be provided on the top of the alternator 1 as shown in FIG. 4. The top cover 300 is fixed to cover the air intake openings of the protection cover 8. The top cover 300 can be directly attached to the engine 200, or attached to the alternator 1. Alternatively the top cover 300 can be attached through a body of the vehicle 100, Also, it is not always necessary to fix the top cover 300 such that the protection cover 8 is entirely surrounded. For example, the top cover 300 can be arranged to partly cover the air intake openings of the protection cover 8. By the top cover 300, it is less likely that water or foreign materials will fall on the alternator 1 and enter the inside through the protection cover 8. Accordingly, the durability of the electrical components can be further improved.

In the embodiment, the engine 200 and the alternator 1 are vertically mounted in the vehicle 100. However, it is not always necessary that the crank shaft 210 and the rotation shaft 33 are completely vertical. For example, the crank shaft and/or the rotation shaft 33 can be inclined at a predetermined angle with respect to a vertical direction.

What is claimed is:

1. An alternator mounted to an engine in a vehicle, comprising:
   a rotor rotatable about a rotation shaft;

a stator provided on an outer periphery of the rotor;

a frame holding the rotation shaft of the rotor and the stator;

an alternator pulley connected to a first end of the rotation shaft on an outside of the frame;

an electrical component provided adjacent to a second end of the rotation shaft on the outside of the frame; and a protection cover disposed to surround the electrical component, wherein the rotation shaft is arranged such that the second end is higher than the first end so that the pulley faces downward;

wherein the frame forms a recess portion on its axial end wall that lays in a substantially horizontal direction under the electrical component, and the recess portion extends in a radial direction.

2. The alternator according to claim 1, further comprising a top cover, wherein the protection cover forms air intake openings through which air is introduced toward the electrical component, and the top cover is arranged above the air intake openings of the protection cover.

3. The alternator according to claim 1, wherein the electrical component includes a brush device.

4. The alternator according to claim 1, wherein the rotation shaft is vertically arranged.

5. The alternator according to claim 4, wherein the engine has a crank shaft that is vertically arranged and a crank shaft pulley that is connected to a lower end of the crank shaft, and the alternator pulley and the crank shaft pulley are arranged parallel to each other at a substantially same level.

* * * * *